United States Patent [19]

Wiggins

[11] 4,151,810

[45] May 1, 1979

[54] AQUARIUM WITH IMPROVED FILTER AND TEMPERATURE CONTROL SYSTEM

[76] Inventor: Arthur R. Wiggins, 108 Brittain St., Roseville, Calif. 95678

[21] Appl. No.: 797,192

[22] Filed: May 16, 1977

[51] Int. Cl.² ............................................. A01K 63/00
[52] U.S. Cl. ...................................................... 119/5
[58] Field of Search ...................... 119/5, 2, 3; 73/228

[56] References Cited

U.S. PATENT DOCUMENTS

| | | | |
|---|---|---|---|
| 2,594,474 | 4/1952 | McGrath | 119/3 |
| 3,149,608 | 9/1964 | Murphy | 119/5 |
| 3,418,973 | 12/1968 | Saito | 119/2 X |
| 3,892,199 | 7/1975 | Huyler | 119/5 |
| 3,914,994 | 10/1975 | Banner | 73/228 |

Primary Examiner—Hugh R. Chamblee
Attorney, Agent, or Firm—Lothrop & West

[57] ABSTRACT

An aquarium tank is provided with a hood formed with a filter compartment. A pump circulates water from the tank through the filter compartment and back into the tank for purification and aeration. A heat exchanger tube is provided in the filter compartment and is selectively connected to a heating unit or a cooling unit to circulate hot or cold fluid through the heat exchanger tube and heat or cool the water being circulated through the filter compartment. A water temperature sensor and a thermostat control valves at the heating and cooling units so as to maintain the water in the tank at any predetermined temperature. The large effective heat transfer area of the heat exchanger tube allows effective tank water regulation with only a small temperature differential between the water and the filter compartment and the water in the tank to eliminate temperature gradients in the tank which may be harmful to certain species of marine life.

12 Claims, 5 Drawing Figures

AQUARIUM WITH IMPROVED FILTER AND TEMPERATURE CONTROL SYSTEM

BACKGROUND OF THE INVENTION

Aquariums for tropical fish generally comprise a water filled tank, an aerator and a heater provided with a thermostat to maintain the water in the tank at a predetermined temperature beneficial to the fish. In most low cost installations, the heater comprises an electrical resistance element enclosed by a protective waterproof tube immersed in the tank. Although such a simple heater is satisfactory for the types of tropical fish which can thrive over a rather wide range of temperature, this type of heater creates a large temperature gradient in the tank which can cause the rapid demise of several species of tropical fish which can survive only within a very narrow temperature range. It is well known that the water in the immediate vicinity of an immersion heater is quite warm whereas the water in the regions of the tank remote from the heater may be intolerably colder.

Circulation of the water in the tank improves the situation by reducing the temperature gradient but is insufficient in the case of certain species of fish.

The practice of providing a filter compartment in a hood which constitutes a cover for the aquarium tank and circulating tank water through the filter compartment for purification and aeration is desirable and well known. In U.S. Pat. No. 3,892,199, Huyler discloses his contribution toward the solution of the problem of temperature gradients in aquarium tanks by providing the conventional immersion heater in the filter compartment of the hood rather than in the tank proper. The increase circulation of the heated water reduces the temperature gradients. However, owing to the limited heat transfer capacity of conventional electrical resistance immersion heaters, the flow rate of water through the filter compartment must be low and the circulating water temperature elevated considerably to effect close regulation of the water temperature in the tank. A substantial temperature differential therefore exists between the heated water in the filter compartment and the water in the tank. The dimensions of the tank in which the overly heated water is returned from the filter compartment may be unsuitable for certain fish. Huyler's aquarium does not comprise a cooling unit.

Although a number of so-called universal aquariums are being marketed which comprise both heating and cooling means so that the water temperature can be adjusted to accommodate either tropical or cold water fish, most if not all of these aquariums suffer from severe temperature gradient problems since the heating and cooling elements are locally disposed and there is insufficient circulation in the tanks to reduce the temperature gradients to acceptable levels. In systems in which cooling is produced by a refrigeration system employing a refrigerant fluid such as freon, even slight refrigerant leakage into the tank water has been found to have disastrous consequences.

SUMMARY OF THE INVENTION

The present invention relates generally to aquariums and, more particularly, to an improved filter and temperature control system for use with aquariums.

An aquarium tank is provided with a hood formed with a filter compartment, and a pump circulates water from the tank through the filter compartment and back into the tank for purification and aeration. A heat exchanger tube is provided in the filter compartment and is selectively connected to a heating unit or a cooling unit to circulate hot or cold fluid through the heat exchanger tube and heat or cool the water being circulated through the filter compartment. A water temperature sensor and thermostat control valves at the heating and cooling units to maintain the water in the tank at any predetermined temperature.

It is an object of the present invention to reduce temperature gradients in aquarium tanks to very narrow limits.

It is another object of the present invention to provide an improved aquarium in which tank water is circulated through a filter compartment in a tank hood, a heat exchanger tube being provided in the filter compartment for either heating or cooling the water being circulated therethrough, the heat transfer capacity of the heat exchanger tube being such that the temperature difference required between the water in the filter compartment and the water in the tank for effective temperature regulation is very small.

It is another object of the present invention to provide an aquarium in which the problem of the contamination of tank water by refrigerant fluid is eliminated.

It is another object of the present invention to provide an aquarium which can accommodate any tropical, cold water, fresh water or salt water fish at any selected water temperature and automatically maintain the water temperature within very narrow limits.

It is another object of the present invention to provide a generally improved aquarium.

Other objects, together with the foregoing, are attained in the embodiment described in the following description and illustrated in the accompanying drawing.

DESCRIPTION OF THE PREFERRED EMBODIMENT

While the aquarium of the invention is susceptible of numerous physical embodiments, depending upon the environment and requirements of use, the herein shown and described embodiment has been made, tested and used, and has performed in an eminently satisfactory manner.

Figure 1:
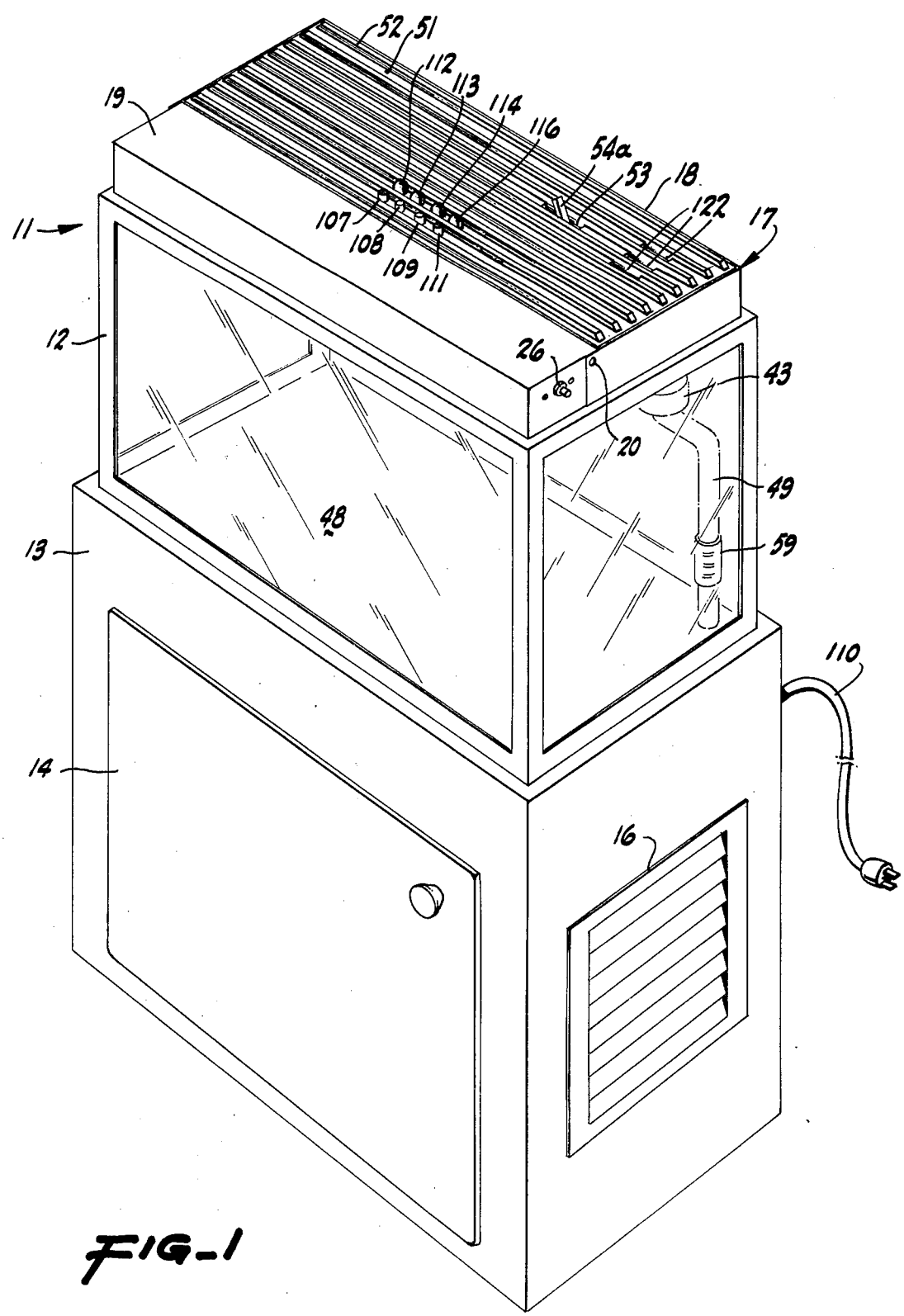
FIG. 1 is a perspective view of an aquarium embodying the present invention.

With particular reference to FIG. 1, an aquarium 11 embodying the present invention comprises an aquarium tank 12 mounted on a cabinet 13 typically provided with an access door 14 and ventilation grilles 16. A hood module 17, or hood unit, mounted on the tank 12 provides a cover, the hood unit 17 including a compartmentalized housing 18 to which is connected a lamp frame 19 by a hinge 20.

Figure 2:
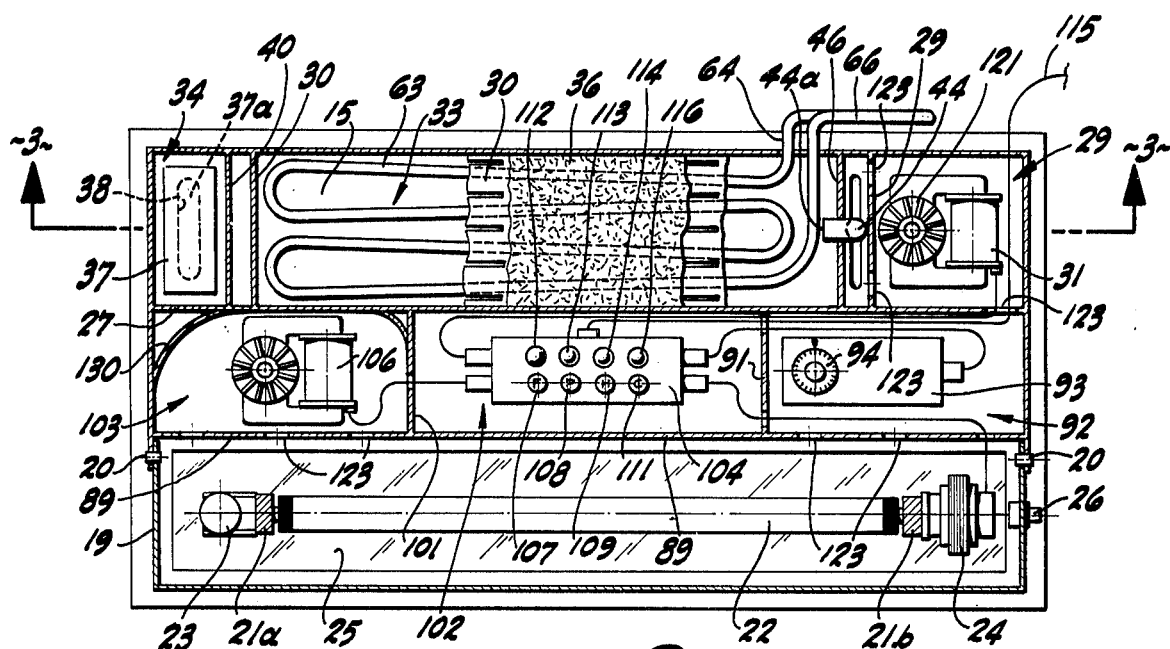
FIG. 2 is an overhead plan view of the aquarium with the upper cover plate cut away and with successive portions of the filter bed and the perforated filter bed support platform cut away to reveal the heat exchanger tube.

As best seen in FIG. 2, fluorescent light sockets 21a and 21b are mounted on the inside of the lamp frame 19 and support a fluorescent lamp 22. The socket 21a is typically provided with a starter 23; the socket 21b, with a ballast coil 24. The fluorescent lamp 22 may be turned on and off by a switch 26 which extends externally from one end of the lamp frame 19. When energized, the lamp 22 illuminates the interior of the tank 12, through an underlying transparent panel 25 from a frontal position, as is desirable in aquariums. As viewed in FIG. 1, the lamp frame 19 may be tilted clockwise about the hinge 20 to expose the lamp 22 and associated elements for maintenance.

The housing 18 includes a horizontal bottom panel 15 and is divided into a plurality of compartments by vertical partitions upstanding from the bottom panel 15. More particularly, a longitudinal partition 27 and a transverse partition 28 define a motor compartment 29 in which is mounted an electric circulating pump motor 31. The partitions 27 and 28 and a transverse partition 32 define a main filter compartment 33 and a secondary filter compartment 34.

A perforated platform 30 supports a bed of filter material 36, such as granules of activated charcoal or the like. The platform 30 is elevated above the panel 15 and thus provides a passageway 35. The partition 32 is cut away at the top and bottom the opening below the bottom of the partition 32 being in communication with the passageway 35.

Figure 3:
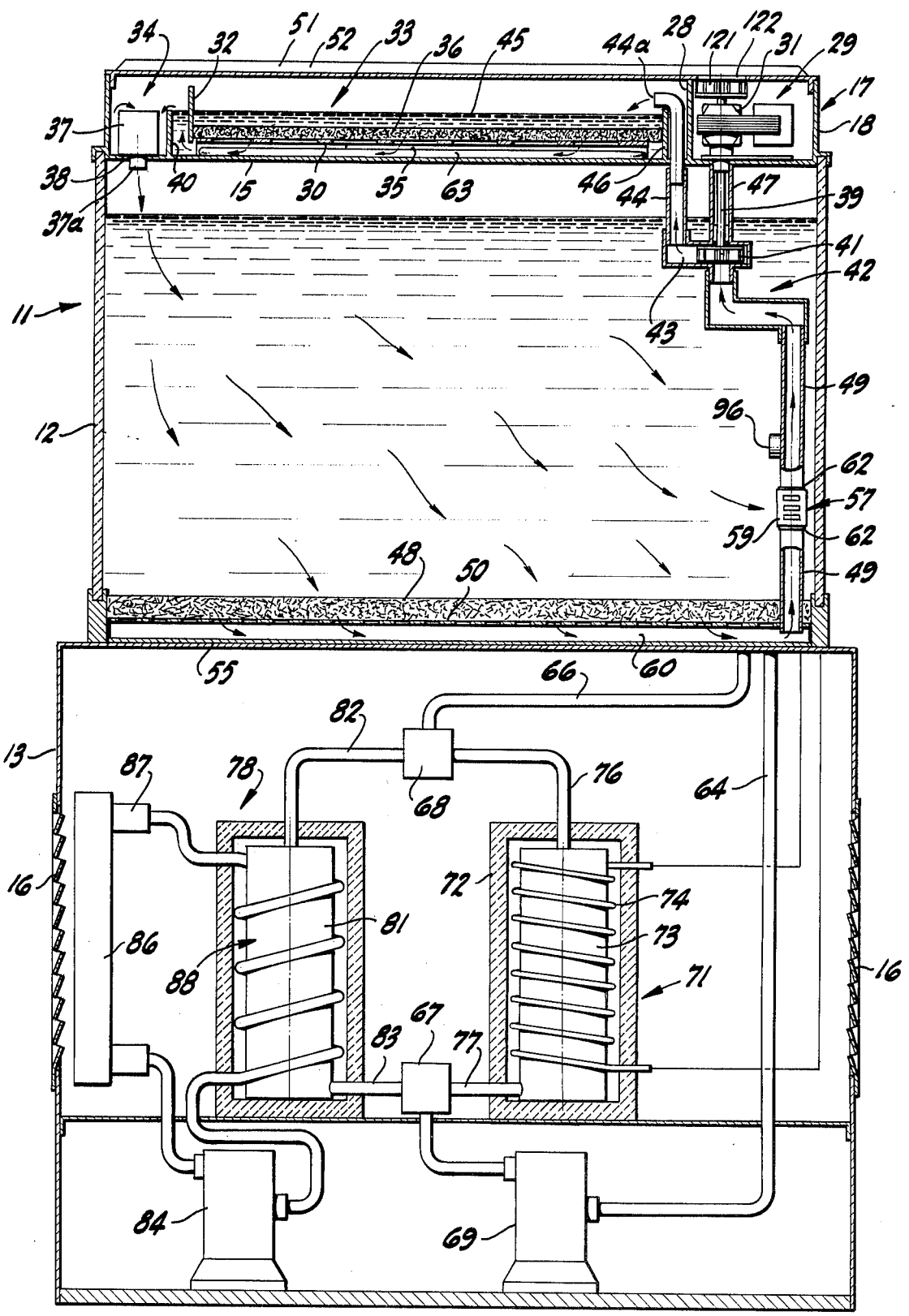
FIG. 3 is a sectional view taken on a line 3—3 of FIG. 2.

To the left of the partition 32 as viewed in FIGS. 2 and 3 is a spillway 40, the upper edge of which is lower then the top of the partition 32 and establishes the water level 45. The bottom of the secondary filter compartment 34 is formed with a discharge orifice 38. A filter canister 37 is detachably provided in the secondary filter compartment 34 and is formed with a lower neck 37a which resiliently and sealingly fits into the discharge orifice 38 to mount the canister 37 in the secondary filter compartment 34. Due to this configuration, any water in the secondary filter compartment 34 must pass through the canister 37 before being returned to the tank 12 through the discharge orifice 38.

As best seen in FIG. 3, the pump motor 31 comprises an elongated, downwardly extending drive shaft 39 to the lower end of which is fixed a pump impeller 41. An intake tube, generally designated as 42, comprises a pump chamber 43 in which the impeller 41 is disposed and an upper pipe section 44 leading from the pump chamber 43 into the primary filter compartment 33. More specifically, the upper or discharge end 44a of the upper pipe section 44 leads over a partition 46, having typically the same height as the partition 32, into the filter compartment 33.

Although not an actual part of the intake tube 42, a caisson tube 47 leads downwardly from the lower panel 15 of the housing 18 to the pump chamber 43 to enclose the drive shaft 39.

The tank 12 is provided in a well known and desirable manner with a sub-gravel filter 48 including a perforate grate 50 which is spaced above the bottom wall 55 of the tank 12 to provide a bottom chamber 60. The intake tube 42 further comprises a lower section 49 which opens at its lower end into the bottom chamber 60 located below the sub-gravel filter 48. The tube 42 connects at its upper end with the pump chamber 43.

With the motor 31 energized, the impeller 41 is rotated, thereby sucking water from the bottom chamber 60 through the lower section 49 of the intake tube 42 into the pump chamber 43. This water is discharged from the pump chamber 43 through the orifice 44a of the upper pipe section 44 of the intake tube 42 into the filter compartment 33. The stream of water discharged from the upper section 44 is aerated as it is urged by pump pressure and gravity into the filter compartment 33.

The water level 45 in the filter chamber 33 corresponds to the height of the spillway 40 and the filter compartment 33 is filled from end to end with the tank water which emerges from the orifice 44a. As can best be seen in FIGS. 2 and 3 the filter compartment 33 is relatively large, and the purification of the tank water circulating therethrough is efficient, the water passing by gravity through the filter 36 supported on the perforated platform 30.

The filtered water flows through the passageway 35 and leaves the primary filter compartment 33 under the lower cutaway portion of the partition 32 thereafter spilling over the spillway 40 into the secondary filter compartment 34. The water is there forced to pass through the filter canister 37 for further purification and is subsequently discharged by the force of gravity into the tank 12 through the discharge orifice 38. The water is further aerated by means of falling over the spillway 40 and falling back into the tank 12 from the secondary filter compartment 34.

The circulation of water through the tank 12 and the hood 17 module is indicated in FIG. 3 by arrows for clarity. Complete circulation of water through the tank 12 is accomplished since the water is taken from the tank 12 at the right end as viewed in FIG. 3 and returned to the tank 12 at the left end thereof. A current is therefore produced in the tank 12 from left to right.

Figure 4:
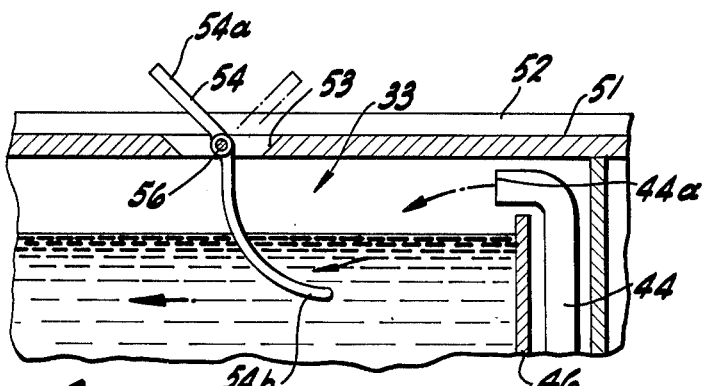
FIG. 4 is a fragmentary elevation, to enlarged scale, of a water flow indicator of the aquarium; and, FIG. 5 is a fragmentary elevation of an intake tube of the aquarium which is provided with a flow control member.
Figure 5:
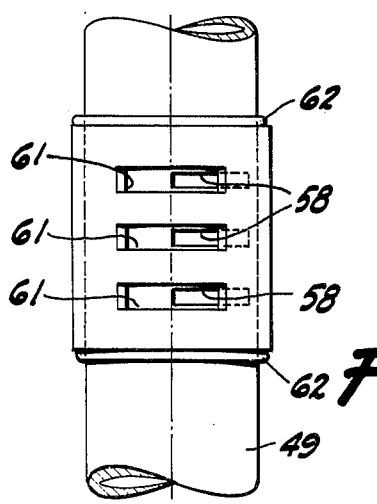

As illustrated in FIGS. 1 and 4, the removable upper wall of the housing 18 is designated as 51 and is formed with a plurality of heat dissipating ribs 52, only one of which is labeled in FIG. 1 for simplicity of illustration. The upper wall 51 is further formed with an opening 53 through which extends the upper end 54a of a flow indicator 54 in the form of an elongated rod or bar. The flow indicator 54 is pivotally mounted to the upper wall 51 about an intermediate fulcrum shaft 56, and the lower end 54b thereof is immersed in the water in the filter compartment 33. The lower end 54b is arcuate as illustrated in order to balance the flow indicator 54 in such a manner as to be urged by gravity to the position shown in FIG. 4 when there is no water flow through the filter compartment 33. However, water flow from right to left as indicated by arrows in FIG. 4 urges the flow indicator 54 to pivot clockwise to an equilibrium position which depends on the velocity of the water flow. The position of the flow indicator 54 therefore provides an immediate indication of the amount of water being circulated through the hood 17.

Whereas in some cases it is desirable to take all of the tank water for circulation from under the sub-gravel filter 48, in other cases it is desirable to take some of the water directly from the tank 12 above the sub-gravel filter 48. For this reason, the lower section 49 of the intake tube 42 is provided with a valve which is generally designated as 57. The lower section 49 is formed with a plurality of apertures 58 and a tubular sleeve 59 is similarly provided with a plurality of apertures 61 which are longitudinally aligned with the apertures 58.

Resilient retaining rings 62 are provided at the ends of the sleeve 59 to allow the same to rotate but not move longitudinally. Rotation of the sleeve 59 causes the apertures 58 and 61 angularly to align to a variable extent and thereby control the size of the openings through which water may pass from the tank 12 into the lower section 49. Rotation of the sleeve 59 allows continuously variable opening of the valve 57 from fully closed (the apertures 58 are completely blocked by the sleeve 59) to fully open (the apertures 58 and 61 are completely aligned). In this manner, the amount of water which is allowed to be circulated through the hood 17 directly from the tank 12 can be controlled from zero to a maximum fraction of the total circulation which depends on the size of the apertures 58.

In accordance with an important aspect of the present invention, a heat exchanger tube 63 is provided in the filter compartment 33 to form a unitary heat exchanger-filter assembly. As appears in FIGS. 2 and 3, the heat exchanger tube 63 is located in the passageway 35 defined by the perforated platform 30 and the bottom panel 15. A supply conduit 64 leads to the heat exchanger tube 63 and a return conduit 66 leads from the heat exchanger tube 63 downwardly into the cabinet 13. The supply conduit 64 and the return conduit 68 are connected to electromagnetically actuated outlet and inlet valves 67 and 68 respectively. A heat exchanger pump 69 is provided in the supply conduit 64 and can conveniently be mounted in the cabinet 13.

In some installations a light, porous material is used as a filter medium and in this case the heat exchanger tube 63 can, if desired, be located on top of the filter medium or between the filter medium and the perforated platform 30, the tube 63 and filter forming a unitary structure, as before.

A heating unit 71 is also provided in the cabinet 13 which comprises an insulated box 72 in which is disposed a heated fluid container 73. The heated fluid container 73 is made of a thermally conductive material such as metal and an electrical heating element 74 is coiled around the heated fluid container 73 in intimate engagement therewith. An inlet pipe 76 connects the container 73 with the inlet valve 68 and an outlet pipe 77 connects the container 73 with the outlet valve 67.

A cooling unit 78 is also provided in the cabinet 13 which comprises an insulated box 79 in which is mounted a cool fluid container 81. An inlet pipe 82 connects the container 81 to the inlet valve 68 and an outlet pipe 83 connects the container 81 to the outlet valve 67. A refrigerant compressor 84 compresses a refrigerant fluid and pumps the same into a condensor 86 in which the fluid liquifies thereby giving up latent heat of vaporization which is radiated to the atmosphere by the condensor 86 through the adjacent ventilation grille 16. From the condensor 86 the fluid passes through an expansion valve 87 into an evaporator 88 which is provided in the form of a tube coiled around the cool fluid container 81. In the evaporator 88, the refrigerant fluid vaporizes thereby absorbing latent heat of vaporization from the cool fluid container 81 and the contents thereof. From the evaporator 88, the refrigerant fluid is returned to the compressor 84.

The partition 27, in conjunction with a longitudinal partition 89 and a transverse partition 91 define in the housing 18 of the hood 17 a thermostat compartment 92. A thermostat unit 93 having a temperature selection dial 94 is mounted in the thermostat compartment 92 and is connected to the control valves 67 and 68, heating element 74, compressor 84 and heat exchanger pump 69 although the detailed connection is not shown. The thermostat unit 93 is further connected to a temperature sensor 96 comprising a thermistor or the like in communication with the tank 12 to sense the water temperature. Although the sensor 96 is shown as being mounted on the lower section 49 of the intake tube 92, the sensor 96 may be provided in any other desired location such as at the inlet end of the filter compartment 33.

The hot and cold water containers 73 and 81, respectively, are filled with a heat exchange fluid which is conveniently water. This fluid is selectively circulated through the heat exchanger pipe 63 in the filter compartment 33 to heat or cool the water being circulated therethrough and thereby regulate or control the water temperature in the tank 12 since the circulated water is returned to the tank 12 and mixed with the water therein.

To set up the aquarium 11 to accommodate any desired species of fish, the tank 12 is filled with the proper fresh or salt water and the dial 94 on the thermostat unit 93 is set to the desired water temperature, which may be above or below ambient. When the water temperature in the tank 12 is below the desired temperature, the thermostat unit 93 actuates the inlet and outlet valves 68 and 67 respectively to circulate the heat exchange fluid through the hot fluid container 73 and heat exchanger pipe 63, but not through the cold water container 81. The thermostat unit 93 furthermore de-energizes the compressor 84 and energizes the heating element 74 to heat the fluid in the hot water container 73. The thermostat unit 93 also energizes the pump 69 to circulate the heated fluid from the hot water container 73 through the heat exchanger pipe 63.

The pipe 63 is made of a material such as a non toxic, non corrosive metal (or coated metal) having a high thermal conductivity so that the thermal transfer capacity of the pipe 63 is much higher than that of the glass tube of a conventional aquarium immersion heater. In addition the pipe 63 is coiled in the filter compartment 33 so as to present a large area for heat transfer. As a consequence, the hot fluid in the pipe 63 readily cools, thereby heating the water circulating through the filter compartment 33 in an efficient manner through the wall of the pipe 63.

Because of the high heat transfer efficiency of the heat exchanger pipe 63, the flow rate of water through the filter compartment 33 may be made quite high. The amount of heat which must be added to the water in the tank 12 to increase the temperature thereof by a predetermined value is a fixed amount. Were the flow rate of the heated circulating water returned to the tank 12 low, the temperature of the circulated water would have to be high in order to add the fixed amount of heat to the tank water. However, if the flow rate of the circulating water is high, the same fixed amount of heat may be added to the tank water with the circulating water at a lower temperature since the heat is distributed in a larger volume of circulating water.

This is an important advantage of the present invention since it reduces to a minimum the temperature gradients in the tank water which might have an adverse effect on sensitive marine life. Due to the high heat transfer efficiency of the heat exchanger system, the flow rate of circulating water can be quite high and the temperature differential between the circulating water and the tank water can be made so low that sensitive fish will not be harmed even if subjected directly to the circulating water.

Where the tank water temperature is above the desired value, the thermostat unit 93 de-energizes the heating element 74 and energizes the compressor 84. The thermostat unit 93 furthermore energizes the pump 69 and actuates the valves 67 and 68 to circulate the heat exchange fluid only through the cold water container 81. In this manner, cold fluid is circulated through the heat exchanger pipe 63 to cool the circulating water and thereby the water in the tank 12. The same advantage of a low temperature differential and the elimination of adverse temperature gradients in the tank is realized when cooling the water. Since the evaporator 88 is isolated from the filter compartment 33, contamination of the circulating water cannot occur. It can be seen that the present aquarium 11 is exceptionally versatile since it provides an even and precisely controlled water temperature and can accommodate any species of fish without modification. The present aquarium 11 fulfills the urgent need found in applications where widely different species of fish must be displayed in the same aquarium on a weekly or similar rotation basis to provide variety for the public.

Preferably, the thermostat unit 93 incorporates a control function such that only the heating system is energized when the desired tank water temperature is below ambient, and only the cooling system is energized when the desired tank water temperature is above ambient. This may be accomplished by means of a hysteresis function which is well within ordinary skill in the art. For example, the heating system will be energized when the tank water temperature drops below the desired temperature by $\frac{3}{4}°$ C. and will be de-energized when the tank water temperature rises above the desired temperature by $\frac{1}{4}°$ C. The cooling system will be energized when the tank water temperature rises above the desired temperature by $\frac{3}{4}°$ C. and de-energized when the tank water temperature drops below the desired temperature by $\frac{1}{4}°$ C. In this manner, the heating system will drop out before the cooling system cuts in for desired water temperatures above ambient and vice-versa, and the tank water temperature may be maintained within limits of $\pm\frac{3}{4}°$ C.

The partitions 27, 89, 91 in conjunction with a partition 101 define a switch compartment 102 and a blower compartment 103. A switch box 104 is provided in the switch compartment 102 which is connected to a fan or blower 106 mounted in the blower compartment 103, the motor 31, the thermostat unit 93, the lamp 22, the heating element 74, the compressor 84 and the pump 69. The switch box 104 is provided with switches 107, 108, 109 and 111 selectively to disable the blower 106, pump 69, heating element 74 and compressor 84 respectively. Lamps 112, 113, 114 and 116 are connected across the switches 107, 108, 109 and 111 either to light when the respective switches are open and corresponding units are disabled or to light when the respective switches are closed and the corresponding units are energized. The switches and lamps protrude externally of the upper wall 51 of the housing 18 through holes (which are not designated by reference numerals) for easy control and monitoring of the status of the aquarium 11. The entire aquarium 11 is powered from a standard wall receptacle through a power cord 110 (see FIG. 1) leading to the cabinet 13 and connected by a line 115 to the switch box 104.

To the upper end of the drive shaft 39 of the motor 31 is mounted a fan 121 which blows air from the motor compartment 29 out of the housing 18 through holes 122 formed through the upper wall 51 above the motor 31. The upper portions of the partitions are formed with orifices collectively designated as 123 which interconnect the compartment for air circulation.

The fan 121 causes convection to occur through all of the compartments thereby serving to evaporate any condensation formed on the walls and operating units of the compartments and discharge the water vapor from the hood 17. This prevents contamination of the tank water by condensate dripping thereinto from the hood 17 and also eliminates the possibility of electrical failure caused by conduction through condensed water.

The blower 106 creates a high pressure in the blower compartment 103 which cooperates with the low pressure in the motor compartment 29 to circulate air and water vapor through and out of the hood 17. An air deflector 130 is mounted in the blower compartment 103 to urge air therefrom through the lamp frame 19, switch compartment 102 and thermostat compartment 92 into the motor compartment 29.

Due to the compartmentalized or modular construction of the aquarium 11, various units may be omitted where a simpler and lower cost installation is required. For example, where only tropical fish with a high temperature tolerance are to be accommodated, the entire heating and cooling system may be replaced with a conventional immersion heater provided in the filter compartment 33.

Depending upon the requirements of a particular installation, the switches and circulating units could be located elsewhere than as shown and described; namely, in the cabinet, for example. So also, the large heat exchanger tube 63 could be located below the sub-gravel (or sub-sand) filter 48, as might be desirable in an open top tank, along with various of the other components in the hood unit 17. In all cases, however, it is important that the heat exchanger 63 be in a closely coupled arrangement relative to a filter so that the water in moving toward and through the filter is in efficient heat transfer engagement with the heat exchanger 63.

It can therefore be seen that I have provided an improved aquarium in which the tank water quickly reaches and accurately is maintained at any preselected temperature throughout a full range and without the occurrence of detrimental temperature gradients in the tank.

It should be noted in the foregoing specification that when the terms "marine life" and "fish" are referred to, they are intended to include all forms of aquatic plant and animal life of both salt water and fresh water varieties.

What is claimed is:

1. An aquarium comprising:
   a. a tank;
   b. a hood mounted on said tank, said hood including a main water compartment extending from an inlet end to an outlet end;
   c. pump means for circulating water from said tank through said main water compartment from said one end toward said other end and back to said tank;
   d. a heat exchanger tube submerged below water level in said main water compartment;

e. means for heating a heat exchange fluid, said heating means including a hot fluid container, and a heater capable of heating the heat exchange fluid located in said hot fluid container, said hot fluid container being provided with an inlet and an outlet;

f. means for cooling the heat exchange fluid, said cooling means comprising a cold fluid container, and a cooling unit capable of cooling the heat exchange fluid located in said cold fluid container, said cold fluid container being provided with an inlet and an outlet;

g. a heat exchanger pump capable of circulating the heat exchange fluid either from said heating means or said cooling means through said heat exchanger tube, said heating means and said cooling means including a supply conduit leading from said heat exchanger pump to said heat exchanger tube and a return conduit leading from said heat exchanger tube to said heat exchanger pump; and, h. temperature control means for selectively connecting said heating means and said cooling means to said heat exchanger pump to maintain the water in said tank at a predetermined temperature, said temperature control means including a first valve for selectively connecting said return conduit to said inlets of said hot and cold fluid containers and a second valve for selectively connecting said outlets of said hot and cold fluid containers to said return conduit.

2. An aquarium as in claim 1 in which said main water compartment includes a first filter.

3. An aquarium as in claim 2 in which said hood further includes a secondary compartment, and a filter canister provided in said secondary compartment, said secondary compartment and said main compartment being in communication so that water circulated from said tank moves from said main compartment into said secondary compartment and through said filter canister prior to returning to said tank.

4. An aquarium as in claim 1 in which said pump means draws water from a first end of said tank and the water falls by gravity from said hood into a second and opposite end of said tank so that a circulating water current is created in said tank from said second end to said first end thereof.

5. An aquarium as in claim 1 in which said tank is provided with a sub-gravel filter; and in which said pump means comprises an intake tube opening below said sub-gravel filter, said intake tube being formed with an aperture above said sub-gravel filter; and an adjustable closure member adjacent said aperture, said closure member being movable to cover and uncover said aperture to a variable extent so as to allow a respective desired amount of water to enter said intake tube through said aperture.

6. An aquarium as in claim 5 in which said closure member comprises a sleeve rotatably fitted around said intake tube, said sleeve being formed with an opening movable in and out of register with said aperture in said intake tube to a variable extent in dependence upon the angular position of said sleeve.

7. An aquarium as in claim 1 further comprising a lamp mounted on said hood to illuminate the interior of said tank.

8. An aquarium as in claim 1 in which said cooling unit comprises an evaporator in heat exchanging relation with said cold fluid container, said cooling unit further including a condensor, an expansion valve, a compressor and conduit means interconnecting said evaporator, said condensor, said expansion valve and said compressor for establishing a fluid cooling cycle therein.

9. An aquarium as in claim 1 in which said temperature control means includes valve means for selectively connecting said heating means and said cooling means to said heat exchanger pump.

10. An aquarium as in claim 1 in which said temperature control means further comprises a temperature sensor capable of sensing the temperature of the water in said tank; and thermostat means to control said first and second valves in response to the sensed temperature.

11. An aquarium as in claim 1 further comprising a flow indicator provided in said hood to indicate the flow rate of water through said main compartment.

12. An aquarium as in claim 11 in which said flow indicator comprises an elongated indicator member pivotally mounted on the hood about an intermediate fulcrum, said indicator member including a lower end below the fulcrum exposed to the flow of water in said main compartment, and an upper end portion extending upwardly externally of said hood, the angular attitude of said upper end portion providing an indication of the flow rate, said indicator member being balanced so as to be urged by the force of gravity toward vertical position indicating minimum flow and to be urged by the water flow against the force of gravity toward an inclined position indicating maximum flow.

* * * * *